Jan. 6, 1925.

C. A. SPOTZ

WEIGHING SCALE

Filed July 8, 1920

Inventor:

Chester A. Spotz,

By Spear Middleton Donaldson Hall

Attorneys.

Jan. 6, 1925. 1,522,037
C. A. SPOTZ
WEIGHING SCALE
Filed July 8, 1920 4 Sheets-Sheet 2

Inventor:
Chester A. Spotz,

Jan. 6, 1925.  1,522,037
C. A. SPOTZ
WEIGHING SCALE
Filed July 8, 1920  4 Sheets-Sheet 4

Inventor:
Chester A. Spotz,
by *Attys.*

Patented Jan. 6, 1925.                BEST AVAILABLE COPY         1,522,037

UNITED STATES PATENT OFFICE.

CHESTER A. SPOTZ, OF NEW YORK, N. Y., ASSIGNOR TO THE SPOTZ MANUFACTURING CO., INCORPORATED, OF NEW YORK, N. Y., A CORPORATION OF CONNECTICUT.

WEIGHING SCALE.

Application filed July 8, 1920. Serial No. 394,661.

*To all whom it may concern:*

Be it known that I, CHESTER A. SPOTZ, a citizen of the United States, and resident of New York city, New York, have invented certain new and useful Improvements in Weighing Scales, of which the following is a specification.

My present invention relates to improvements in weighing scales of the type known as "automatic head" and embodying weight determining means such for example as an indicating arm traveling over a graduated scale or dial.

One object of the invention is to provide a simple, economical and durable apparatus embodying means for securing greater accuracy than is the case with scales as heretofore constructed so far as I am aware.

Another object is to provide a scale in which the weight determining mechanism shall be operated by a source of power independent of the mechanism operated by the weight to be weighed, thereby relieving the weighing platform of the work of operating the weight determining mechanism.

A further object is to provide a construction in which inaccuracies developed in use may be corrected by adjustments made in the weighing head alone, thus avoiding the necessity of overhauling the main scale parts by expert operators.

Still another object is to provide a scale having indicating mechanism readily adjustable to compensate for inequalities in the main scale parts thus reducing the necessity for skilled labor and accurate workmanship in the construction of such parts with a consequent cheapening in the cost of production.

With these and other objects in view which will hereinafter appear, the invention includes the novel features of construction and arrangement and combination of parts hereinafter described, the nature and scope of my invention being defined by the appended claims.

My preferred embodiment of the invention is illustrated in the accompanying drawings in which—

Fig. 6 is a detail view of the cam plate and adjusting means therefor.

Fig. 7 is a sectional plan view taken through Fig. 6.

Figure 1:
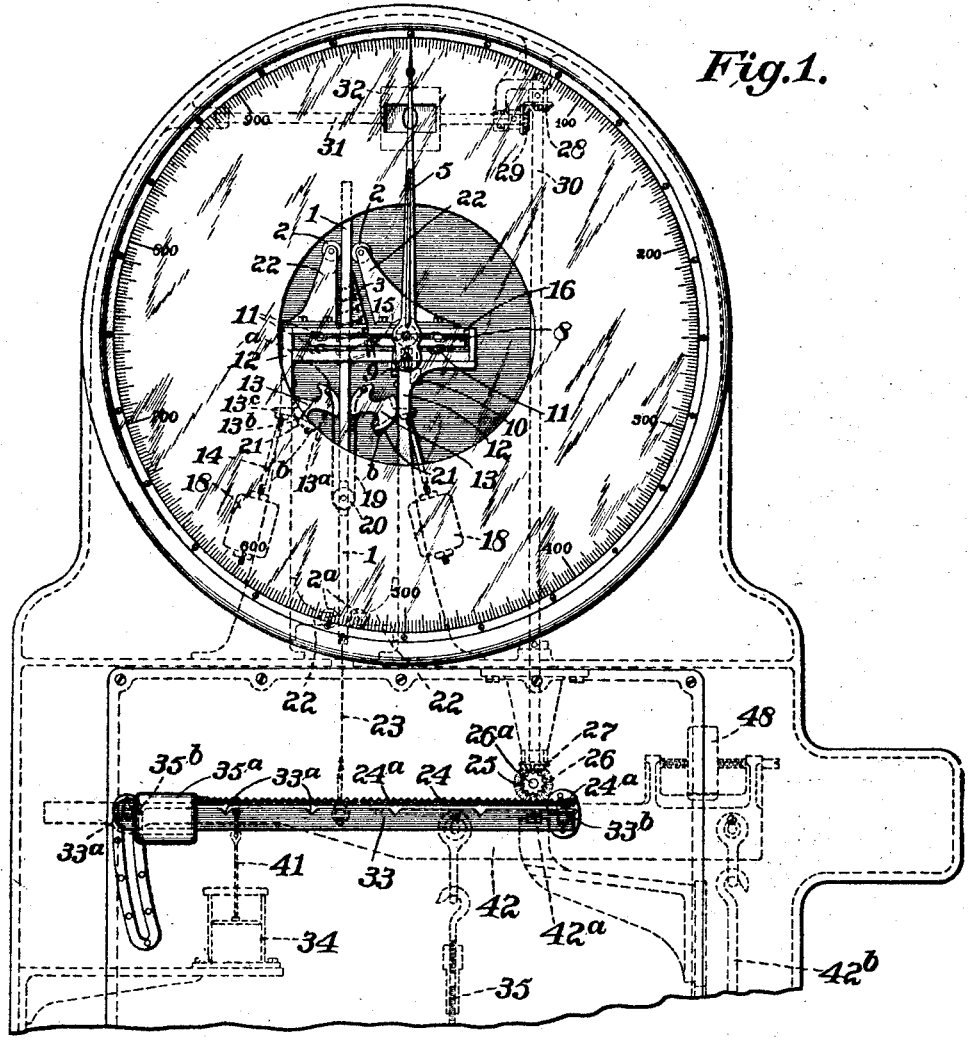
Figure 1 is a front elevation of a scale mechanism embodying my improved construction, partly broken away.
Figure 2:
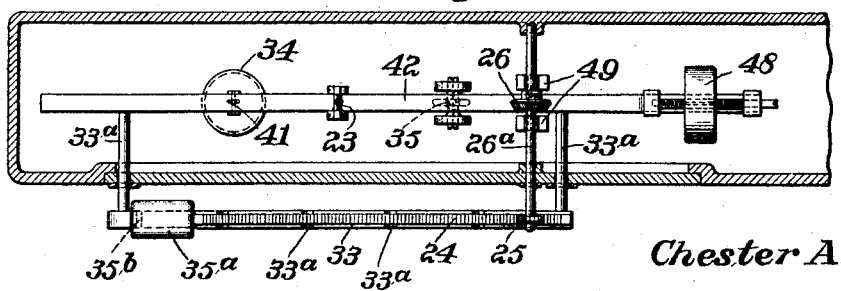
Fig. 2 is a sectional plan view taken substantially in a plane along the main lever.
Figure 3:
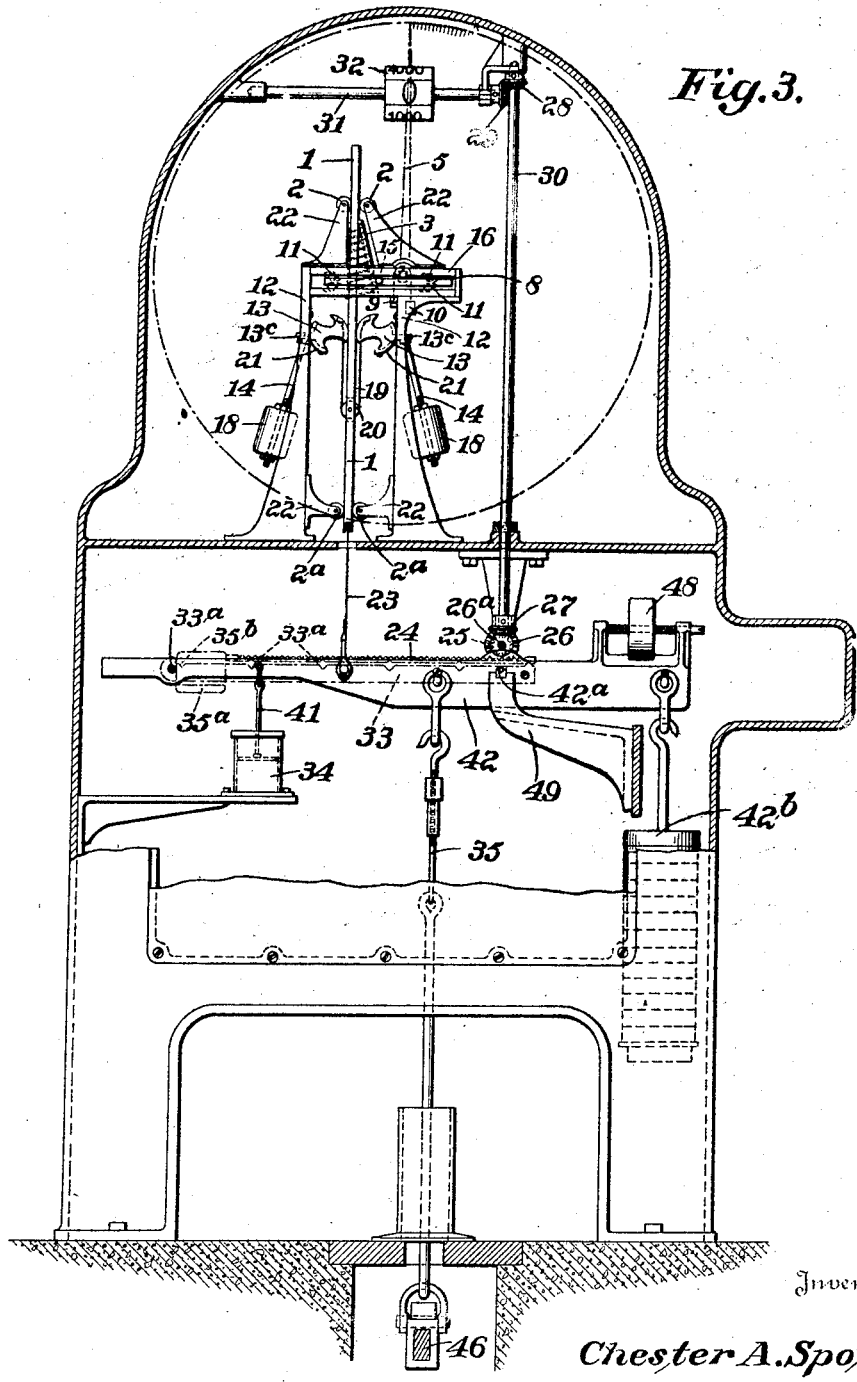
Fig. 3 is a sectional front elevation of the complete scale.
Figure 4:
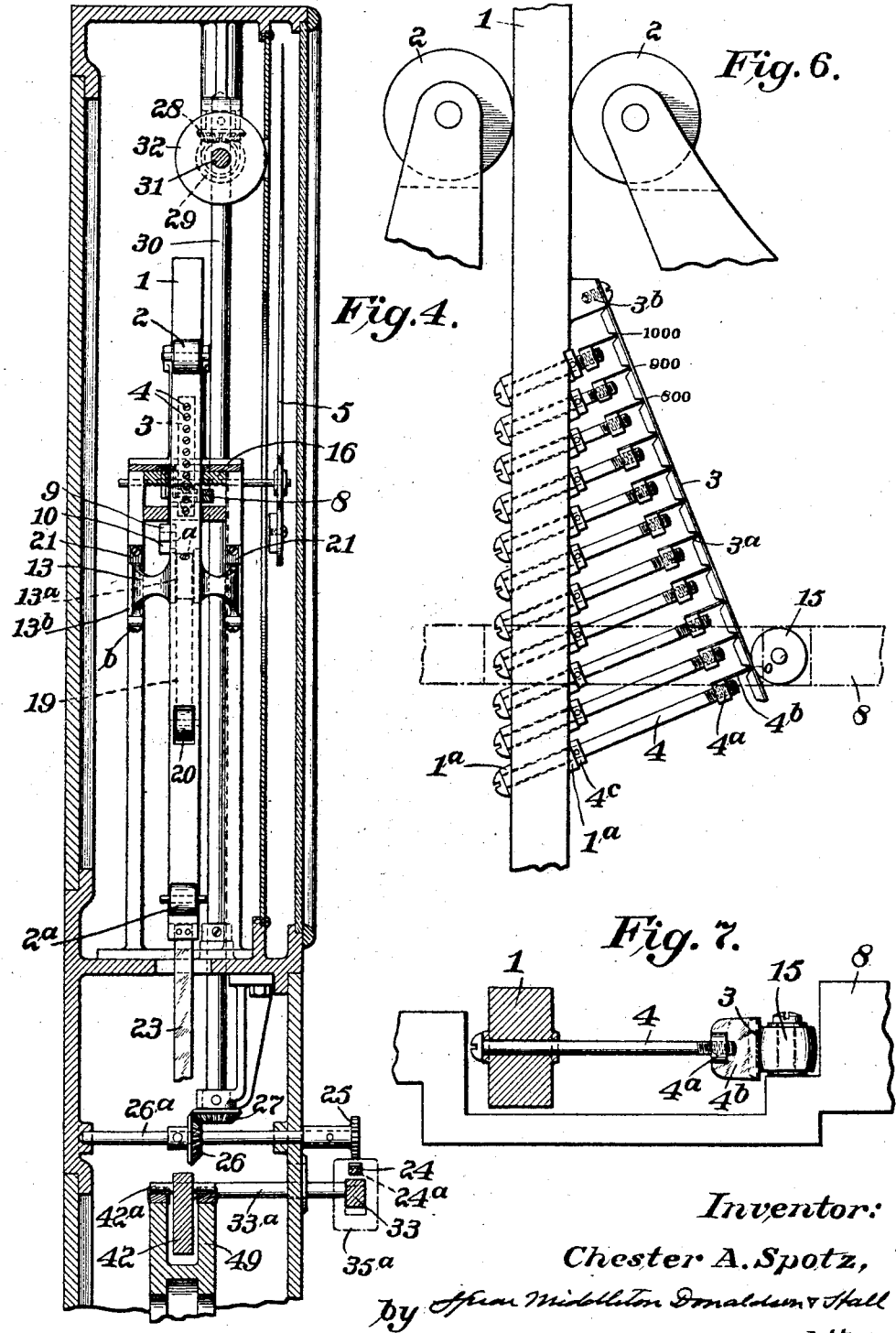
Fig. 4 is a vertical central sectional view through the scale, partly broken away.
Figure 5:
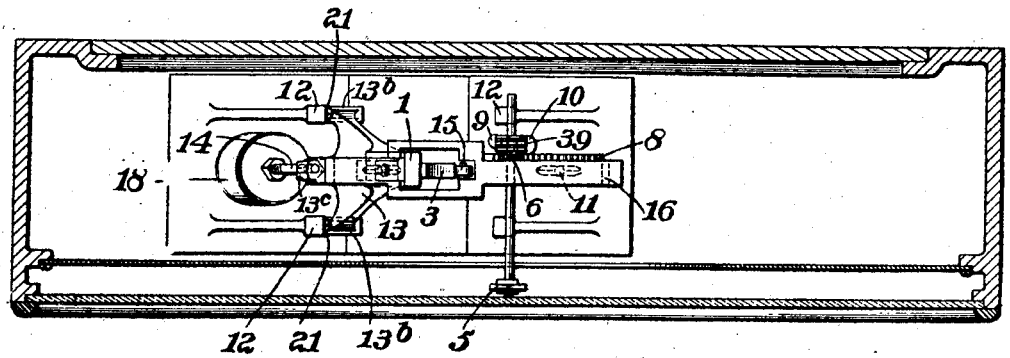
Fig. 5 is a horizontal sectional view taken substantially along the rack mechanism.
Figure 8:
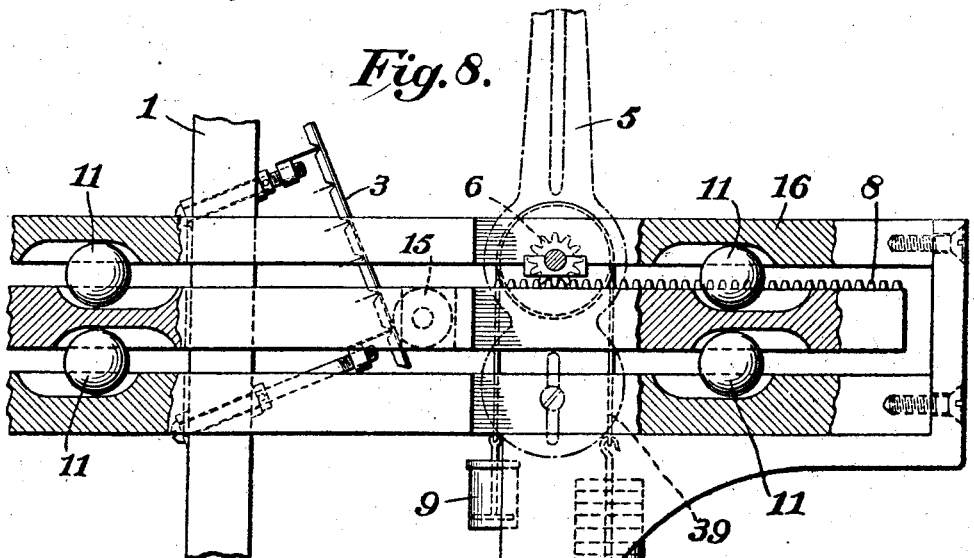
Fig. 8 is a detail view, partly in elevation and partly in section.
Figure 9:
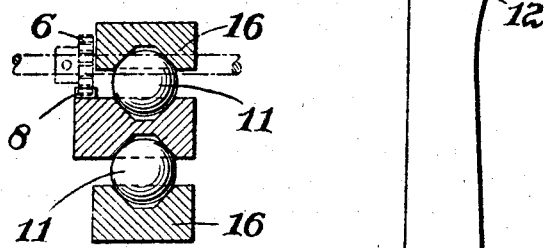
Fig. 9 is a transverse section through Fig. 8.

Referring by reference characters to these drawings the numeral 46 designates the main scale lever or beam which is designed to be connected to and operated by the weighing platform in the usual or any desired manner, and said platform and its connections being omitted from the drawings as forming no part, per se, of the present invention.

The beam 46 is connected by a rod 35 to scale beam 42 fulcrumed at $42^a$ upon a bracket or bearing member 49. A pendant or carrier for removable weights is suspended from one end of the beam 42 as indicated at $42^b$ and this end of the beam is also provided with an adjustable weight 48 for finer adjustments. The opposite end of the beam is connected by a rod 41 with a dash pot 34.

The beam 42 is connected by a connecting tape 23 with the lower end of a vertically reciprocable plate 1 having accurately ground opposite faces which are guided between upper and lower pairs of opposed rollers as indicated at 2, 2, $2^a$, $2^a$, respectively, these rollers being rotatably carried by bracket members 22 carried by the vertical frame parts 12. A roller 20 is journaled in an opening or bifurcation in the plate 1, which roller rests in or engages the depending loop of a tape or band 19 the upper ends of the loop being passed over the curved faces $13^a$ of the roller members 13 and suitably secured to the upper ends of said faces by means such as the screws $z$, the said curved faces of the roller members being recessed to receive the tapes.

The said roller members are provided on their opposite sides with spaced curved faces 13$^b$ which are designed to lie in juxtaposition to the inner faces of the vertical frame members 12. Tapes or bands 21 have their lower ends connected to the lower ends of these curved faces 13$^b$ as indicated at $b$, and their upper ends pinned or otherwise suitably secured to the frame members 12. The faces 13$^b$ are likewise recessed to receive the tapes. The said roller members are provided, intermediate the frame members, with lugs or projections 13$^c$ to which are secured arms 14 carrying counter weights 18, and it will be seen that as the bar 1 moves downward under the action of the load the roller members will be rotated on their axes, the tapes or bands having an unwinding action on the downward movement of the bar, and a reverse or winding action on the upward movement, the weights tending to rock the roller members in the direction to hold the plate 1 at the limit of its upward movement. These roller members are in effect floating drums on which the reversely placed bands wind and unwind as described. Preferably the roller members or drums are of such diameter as to leave a very slight amount of clearance between their curved surfaces and the faces of the plate bar 1 respectively so as to give a substantially floating effect and eliminate friction, the cooperating faces of frame members 12 being accurately ground and exactly parallel with the faces of plate 1.

Secured to the upper portion of the plate 1 in convenient position on one side thereof is an inclined cam member which is designed to coact with and determine the movement of a sliding rack 8 movably supported in a guideway 16, anti-friction rollers 11 being preferably provided to enable the rack to move more freely.

The rack meshes with a pinion 6 on the shaft of which is an indicating arm or pointer 5 which cooperates with the indicating scale or dial, which scale and dial are intended to be representative of any suitable weight determining means. It will thus be seen that the reciprocating movement of the rack causes the pointer to travel over the face of the dial. Means are provided tending to move the pointer arm to the right or in a clockwise direction and the rack to the left, and such means preferably takes the form of a wire or tape 39 having one end wound upon and secured to the pointer shaft or to a drum carried thereby, the other end of the wire being provided with a pendant weight indicated at 10. Such weight acts as motor means independent of the load on the scale platform for operating the pointer arm, so that the weighing platform and parts coacting there are relieved of the work of operating the indicating means.

The pointer shaft or drum is also provided with a flexible element such as a wire operating in a manner reverse to the wire 39 and connected to the movable element of a dash pot designated 9.

The wire connection to the dash pot is made of sufficient flexibility to enable it to bend freely when the pointer is moving backwardly or in a counter clockwise direction, enabling the free return of the pointer to zero.

Preferably the end of the rack bar which contacts with the cam is provided with anti-friction means such as the roller 15.

From the foregoing description it will be apparent that normally the bar 1 will be held by the action of the counter weights at the limit of its upward movement and the rack bar will be forced outwardly by the action of the cam face 3 on the roller to cause the pointer to be positioned at zero on the scale. When the weight on the scale platform has been removed and the bar 1 is moving upwardly the cam will at first be carried sufficiently far by the inertia of the counter-weights to swing the pointer past the zero mark. As the cam again moves downwardly under the tendency of the counter weights to establish an equilibrium the roller will be temporarily held out of contact with the face of the cam by the action of the dash pot and the cam will be freed from the slight frictional contact of the roller thus enabling the weights to more quickly and accurately assume their initial position. Thereafter the action of the dash pot permits the roller on the slide to come to rest against the face of the now stationary cam and the pointer to indicate zero on the scale.

The cam is constructed and arranged so as to be readily adjustable to correct any inaccuracies. My preferred manner of accomplishing this is to form the cam in the shape of a plate member having a certain degree of flexibility and to connect it to the plate 1 by a plurality of independently adjustable connections. This may be conveniently accomplished by providing the cam plate with a plurality of transverse recesses or grooves in its rear face as indicated at 3$^a$ to which are connected a plurality of adjusting rods or struts, the upper end of the cam plate being preferably permanently and non-adjustably connected to the plate 1 as indicated at 3$^b$. The adjusting means are preferably in the form of screws 4 having non-threaded portions passed through openings in the plate 1 and heads designed to be turned by means of a screw driver or other suitable tool. The threaded portions of the screw rods carry nuts 4$^a$ to which are secured plate members 4$^b$ which have a certain amount of resiliency to allow for any necessary relative movement during adjustment but which are of sufficient stiffness to sustain the cam plate against the thrust of the rack. The plate 1 is preferably provided with projections 1ª in line with the screw holes and having openings through which the screws pass. Means are provided to hold the screws against longitudinal movement in the plate and projections, which means may take the form of collars 4ᶜ. It will be understood that any number of supporting or adjusting screws or members may be used as found desirable the number depending on the length of the cam, size of the scale, etc., and the number shown in the drawings is intended to be representative of any desired number. Similarly, though I have shown in the drawings the cam as in the form of a substantially straight cam plate this again is representative of any form of cam plate which, in its movement is adapted to properly and accurately position the various portions of the working face of the cam.

By making the cam plate with a plurality of portions independently adjustable it will be readily seen that any particular portion may be adjusted to correct the reading on the scale without affecting the adjustment or reading of any other portion or portions, and without disturbing the equilibrium of the scale.

For example, the upper extremity of the cam plate being set or adjusted for a reading, say, of 1000 pounds, and the next succeeding adjusting screw being located at the 900 pound point the manipulation of said screw will correct the reading of the 900 pound portion of the cam without affecting the 1000 pound contact portion. Similarly the proper adjustment for 900 pounds having been secured, the portion of the cam plate for determining the position of the pointer for the 800 pound reading may be made without affecting the 900 pound adjustment and so on for each successive adjustment. This is due to the fact that the upper end of the cam plate or bar is rigidly connected to the bar 1.

An important feature of my invention lies in the fact that by the provision of the adjustable cam in the scale head I am enabled to use rollers 13 of cylindrical formation, and am thus relieved of the necessity of providing specially designed cams which are difficult and expensive to construct.

To adapt the scale for weighing beyond the maximum amount indicated on the dial I provide a capacity indicator graduated in multiples of the maximum of the indicating scale and adapted to be operated by the shifting of a weight member on the beam 33 supported from main lever 42. This may be advantageously effected in the following manner:

On a horizontal shaft 31 suitably journaled in rear of the dial is a rotary drum or similar member 32 which carries on its face indicating numerals. If the capacity of the dial is for example 1000 pounds the drum would carry the numerals 0, 1000, 2000, etc., observable through an opening in the dial plate when positioned opposite said opening.

Shaft 31 is operated by means such as intermeshing gears 28 and 29 and vertical shaft 30 provided at its lower end with a bevel gear 27 meshing with a bevel gear 26 on shaft 26ª journaled in the scale casing. Shaft 26ª carries fast thereon a pinion 25 having teeth to cooperate with an underlying rack bar 24 or capacity poise rack. This rack bar is supported from a beam or bar 33 connected by transverse pins or rods 33ª with the beam 42, said pins extending through elongated curved slots in the scale casing. The beam 33 is provided with an adjustable weight 35ª having a rib or tooth 35ᵇ designed to cooperate with any one of a series of substantially V shaped notches 33ᵛ in the upper surface of beam 33 and one end of the rack bar (the left hand end Fig. 1) is rigidly secured to the weight.

The right hand end (Fig. 1) of the beam 33 is provided with an upwardly extending substantially wedge shaped projection 33ᵇ designed to cooperate with any one of a series of similarly shaped recesses 24ª formed in the under side of the rack bar.

Normally the projection on the weight will be noted in the extreme left hand notch of the beam 33 and the projection 33ᵇ will engage in the extreme right hand notch of the rack bar at which time the rack bar will be held by gravity in such position that the teeth of the rack will be out of engagement with the teeth of pinion 25. With the parts in this position the scale will be set for the capacity of the dial, say 1000 lbs and the indicator 32 will stand at zero.

If the weight 24 is shifted to the right to engage the next notch in the beam 33 the initial movement will cause the projections and recesses above described to raise the rack into engagement with the pinion 25 which engagement will be maintained until the next set of recesses is reached when the rack bar will again drop out of engagement with said pinion by which time the indicator will have been moved to indicate 1000 lbs., the amount to be added to the amount indicated on the dial in the weighing of any article or material between one and two thousand pounds. A further movement of the weight into the other notches to the right correspondingly increases the capacity of the scale and indicates the increased capacity on the capacity indicator 32, and on movement of the weight to the left the reverse action takes place.

By having the rack and gear out of mesh during the weighing operation the scale beam is free from any influence by the capacity indicator operating connections.

The teeth of the pinion and rack bar are shaped so as to properly mesh under any position of the beam 42, to prevent any possible misalignment of the teeth.

It will be noted that the action of dash pot 9 is made slower than that of the dash pot 34 to allow the counter balance weights to establish an equilibrium during the action of dash pot 9 in the manner and for the purpose hereinbefore described.

Having thus described my invention, what I claim is:

1. In a weighing scale, a cam adapted to be moved by the weight to be weighed, a weight determining member, a movable member operatively connected with said weight determining member and having a part contacting with a high part of the cam when said determining member is at zero indicating position, and means for causing said contacting part to follow the lower portions of the cam as the latter is moved by the weight being weighed.

2. In a weighing scale, a cam adapted to be moved by the weight to be weighed, a weight determining member, a slidable member operatively connected with said weight determining member and having a part contacting with a high part of the cam when said indicating member is at zero determining position, and means for causing said contacting part to follow the lower portions of the cam as the latter is moved by the weight being weighed.

3. In a weighing scale, a cam adapted to be moved by the weight to be weighed, a movable member having a part slidably contacting with said cam, said part contacting with a high part of the cam when the indicating mechanism is at zero, means for effecting the adjustment of individual portions of the surface of the cam to change the contour of the working face of the cam, and determining mechanism connected to be operated by said movable member.

4. In a weighing scale, a flexible cam adapted to be moved by the weight to be weighed, a plurality of devices connected to different portions of said cam for adjustably sustaining the same, a movable member coacting with the face of the cam and determining mechanism connected to be operated by said movable member.

5. In a weighing scale, a flexible cam adapted to be moved by the weight to be weighed, a plurality of devices for adjustably sustaining different portions of the face of said cam, a movable member having a part contacting with the face of said cam, yieldable means for urging said member towards the cam, and determining means connected to be moved by said movable member.

6. In a weighing scale, a cam adapted to be moved by the weight to be weighed, a slidable rack bar having a portion contacting with a high position of said cam when no weight is on the scale, a pinion meshing with said rack bar, weight determining means arranged to be operated by said pinion, and means for yieldingly pressing said rack bar towards the cam to cause it to follow the receding surface of the cam as the latter moves under the action of the weight being weighed.

7. In a weighing scale, a cam adapted to be moved by the weight to be weighed, a movable member having a portion slidably coacting with said cam, and engaging the high part thereof when no weight is on the scale, yieldable means for urging said movable member towards the cam, a dash pot connected to retard the movement of said movable member, and weight determining means connected to be moved by said movable member.

8. In a weighing scale, a cam adapted to be moved by the weight to be weighed, a movable member having a part contacting with said cam, a rack bar mounted to slide towards and from the cam, a gear meshing with said rack bar, weight determining means connected to be operated by said gear, a weight arranged to move said rack bar towards the cam, and a dash pot arranged to resist or retard said movement.

9. In a weighing scale a vertically movable plate arranged to be moved downwardly by the weight to be weighed, an inclined cam plate carried by said movable plate, and having its narrow part uppermost, a movable member having a part for contacting with said cam plate, means for causing said movable member to follow the receding face of the cam plate, and weight determining means connected to be operated by said movable member.

10. In a weighing scale, a vertically movable plate arranged to be moved by the weight, a flexible cam plate carried by said vertically movable plate, means for adjustably sustaining different portions of said cam plate in determined position, a movable member having a part cooperating with the face of said cam plate, and weight determining means connected to be moved by said movable member.

11. In combination a member supported to move in a rectilinear path under the action of the weight to be weighed, a flexible cam plate, means adjustably connecting different portions of the surface of said cam plate to said member, a slide having a part contacting with said cam plate, and weight determining means connected to be moved by said slide.

12. In a weighing scale a bar adapted to be moved in a rectilinear path by the weight to be weighed, a flexible cam bar having one end rigidly attached to said bar and inclined thereto, means adjustably connecting other portions of said cam bar to said first named bar, a slide having a part coacting with said cam bar, and weight determining means actuated by said slide.

13. In a weighing scale, a scale platform, a member to be moved thereby, a flexible cam having one end rigidly connected to said member, means adjustably connecting the remainder of said cam at a plurality of points with said member, a movable member having a part to coact with said cam, means for yieldingly moving said movable member towards the cam, and weight determining means operatively connected to said movable member.

14. In a weighing scale, a flexible cam member arranged to be moved under the action of the weight to be weighed, a plurality of struts adjustably supporting different portions of the face of said cam, a movable member coacting with the face of said cam, and weight determining means connected to be moved by said movable member.

15. In a weighing scale, a cam arranged to be moved by the weight to be weighed, said cam comprising an elongated member having a plurality of weakened portions to impart flexibility, adjustable struts connected to said cam adjacent said weakened portions, a movable member having a part cooperating with the surface of said cam, and weight determining means connected to be moved by said movable member.

16. In a weighing scale a vertically movable plate arranged to be moved by the weight, upper and lower pairs of rollers between which said plate is guided, an inclined cam plate carried by said vertically movable plate, and having its narrow part uppermost, a movable member having a part cooperating with said cam plate, and weight determining means connected to be operated by said movable member.

17. In a weighing scale, a vertically movable plate arranged to be moved by the weight to be weighed, standards arranged parallel with the opposite faces of said plate, floating rollers arranged between the faces of said plate and said standards, a flexible element having its ends connected to said rollers and its intermediate portion engaging a part carried by said plate, other flexible elements connected respectively to said standards and said rollers, and counterbalancing weights connected to said rollers.

18. In a weighing scale, a vertically movable plate arranged to be moved by the weight to be weighed, supporting members arranged parallel with the opposite faces of said plate, floating rollers arranged between said plate and said guide members, said plate having a recess provided with a roller, a flexible element having its ends connected to said floating rollers and its intermediate portion passing around the roller in said recess, flexible elements connected respectively to said rollers and to said supporting members, and counterweights connected to said rollers.

19. In a weighing scale, a member supported to move in a rectilinear path under the action of the weight to be weighted, a cam plate having weakened portions at spaced intervals, struts adjustably connecting said cam plate adjacent said weakened portions to said member, a slide having a part contacting with said cam plate, and a weight determining element connected to be moved by said slide.

20. In a weighing scale a vertically movable plate arranged to be moved by the weight to be weighed, upper and lower antifriction guides for said plate, indicating mechanism arranged to be moved by said plate, vertical supporting members arranged parallel to the opposite faces of said plate, floating rollers arranged between the opposite faces of said plate and said supporting members, flexible means connecting said floating rollers respectively to said plate and to said vertical members, and counterweights connected to said floating rollers.

21. In a weighing scale, a weighing platform, a vertical plate guided in a rectilinear path and arranged to be moved by said platform, frame members adjacent said plate, drum members having cylindric surfaces interposed between said plate and frame members, flexible elements connecting said drums to said plate and frame members, counterweights connected with said drums, a cam carried by said plate, and indicating mechanism arranged to be positioned by said cam.

22. In a weighing scale, a weighing platform, a vertically movable member arranged to be moved by said platform, frame members spaced from the opposite sides of said vertically movable member, cylindrical drums interposed between said frame members and vertically movable member, said drums being operatively connected with said frame members and said movable member, counter weights connected to said drums, a cam connected to be moved by said movable member, and indicating mechanism arranged to be positioned by said cam.

23. In a weighing scale, the combination with the weighing platform and indicator mechanism arranged to be operated therefrom, of increased capacity mechanism comprising a shiftable part embodied in the scale mechanism, an increased capacity indicator, and means whereby the operation of said shiftable part automatically operates said increased capacity indicator, said shiftable part being normally disconnected from said indicator and means being provided for automatically connecting said parts on movement of said shiftable part.

24. In a weighing scale, a beam member adapted to be moved by the substance to be weighed, weight indicating mechanism arranged to be operated by movement of said beam, a shiftable weight supported from said beam, a rack bar slidingly supported from said beam and connected with said weight, a pinion arranged to cooperate with said rack bar, said rack bar being normally out of engagement with said pinion, excess capacity indicating means operatively connected with said pinion, and means whereby the shifting of the weight a predetermined amount automatically first engages said rack with said pinion and after rotation of said pinion to the requisite degree automatically disconnects the rack therefrom.

25. In a weighing scale a pivoted beam member, weight indicating mechanism arranged to move in accordance with the movement thereof, a weight and connected rack bar slidably supported by said beam, a pinion arranged to cooperate with said rack bar, said rack bar being normally disengaged from said pinion, and coacting cam means spaced at intervals and arranged to automatically move said rack bar into engagement with the pinion while the rack bar is being moved.

26. In a weighing scale a load operated beam having a plurality of substantially V shaped notches in its upper edge, weight indicating mechanism for indicating the weight of the load on the beam, a shiftable weight on the beam having a substantially wedge shaped projection to cooperate with said notches, a rack bar having one end rigidly connected with said shiftable weight and having a plurality of substantially V shaped notches in its under face, said beam having a substantially wedge shaped projection arranged to coperate with the notches in the rack bar, a pinion overlying said rack bar and normally out of engagement therewith, said projections and notches being arranged to elevate the rack bar into engagement with the pinion on the shifting of the weight and rack bar, and excess capacity indicating mechanism arranged to be operated from said pinion.

27. In a weighing scale a cam arranged to be moved by the weight to be weighed, said cam comprising an elongated member having a plurality of weakened portions to impart flexibility, a support for the cam, and adjustable struts connecting said member adjacent the weakened portions with said support.

28. In a weighing scale, a member adapted to be moved by the weight to be weighed, a weight determining element, a movable member operatively connected to the weight determining element, and means whereby the movement of said first named member controls the movement of said second member including a cam carried by one of said members and a cam contact part carried by the other member positioned to contact with a high part of said cam when the weight determining element is at zero, and to follow the receding surface of the cam as the latter moves under the action of the weight being weighed.

29. In a weighing scale, a member arranged to be moved by the weight to be weighed, counterbalancing means operatively connected therewith, a weight determining element, a movable member operatively connected with the weight determining elements, and means whereby the movement of said first named member controls the movement of said second member, said means including a cam carried by one of said members and a cam contact device carried by the other member and arranged to be controlled as to position by its travel across the face of the cam, said cam having an elongated contact surface portion, a support therefor, and adjustable struts connecting different portions of said surface portion with said support whereby said surface portion may be adjusted to correct inaccuracies in the scale reading without disturbing the equilibrium established by said counterbalancing means.

30. In a weighing scale a cam for controlling the operation of the weight determining mechanism, said cam comprising an elongated member having a plurality of weakened portions to impart flexibility and means operating in connection with said weakened portions for effecting adjustment of the surface of said cam.

31. In a weighing scale a bar adapted to be moved in a rectilinear path by the weight to be weighed, a flexible cam element, means adjustably connecting different portions of said element to said bar, a movable element having a part contacting with and adapted to have its movement controlled by said cam element, and weight determining means operatively connected with said movable element.

32. In a weighing scale, a member adapted to be moved by the weight to be weighed, counterbalancing means connected therewith for establishing the equilibrium thereof, a flexible cam connected to be moved by said movable member, an element movable towards and from said flexible cam and arranged to have sliding contact therewith when the cam is moved, weight determining means operatively connected with said element, and means for adjusting different portions of said flexible cam to different elevations whereby to adjust the position of the weight determining means without varying the equilibrium.

33. In a weighing scale, a vertically movable plate adapted to be moved by the weight to be weighed, weight determining mechanism arranged to be controlled by the movement of said plate, vertical supporting members arranged parallel to the opposite faces of said plate, floating rollers located between the opposite faces of said plate and said supporting members, flexible means connecting said floating rollers respectively with said plate and said vertical supporting members, and counter balancing means connected with said rollers.

34. In a weighing scale, a flexible cam adapted to be moved by the weight to be weighed, counterbalancing means therefor, a plurality of devices adjustably sustaining different portions of the face of said cam, a member movable towards and from the cam, and yieldably urged towards the cam, and carrying a part for contact with the face of the cam, a scale dial, indicating means arranged to travel over said dial, and connected to be moved by said member, said plurality of devices being arranged in determined relation to unit indications on the dial whereby scale readings at successive points may be individually corrected without altering the equilibrium of the scale.

35. In a weighing scale, a cam arranged to be moved by the weight to be weighed, a movable rack carrying a part contacting with a high part of the cam when no weight is on the scale, a pinion meshing with said rack, weight determining means connected to be operated by said pinion, and means for yieldingly pressing said rack in one direction to cause it to follow the receding surface of the cam as the latter moves under the action of the weight being weighed.

In testimony whereof, I affix my signature.

CHESTER A. SPOTZ.